(12) United States Patent
Orzen

(10) Patent No.: US 8,938,546 B2
(45) Date of Patent: *Jan. 20, 2015

(54) DATA RETRIEVAL IN A TWO-WAY NETWORK

(71) Applicant: OpenTV, Inc., San Francisco, CA (US)

(72) Inventor: Matthew Orzen, San Francisco, CA (US)

(73) Assignee: OpenTV, Inc., San Francisco, CA (US)

( * ) Notice: Subject to any disclaimer, the term of this patent is extended or adjusted under 35 U.S.C. 154(b) by 9 days.

This patent is subject to a terminal disclaimer.

(21) Appl. No.: 13/671,336

(22) Filed: Nov. 7, 2012

(65) Prior Publication Data

US 2013/0133015 A1    May 23, 2013

Related U.S. Application Data

(63) Continuation of application No. 11/599,688, filed on Nov. 15, 2006, now Pat. No. 8,326,997.

(51) Int. Cl.
```
G06F 15/16      (2006.01)
H04N 7/20       (2006.01)
H04N 7/173      (2011.01)
H04N 21/472     (2011.01)
H04H 20/16      (2008.01)
H04H 40/09      (2008.01)
```
(Continued)

(52) U.S. Cl.
CPC ............ *H04N 21/472* (2013.01); *H04N 20/24* (2013.01); *H04N 20/26* (2013.01); *H04H 20/16* (2013.01); *H04H 40/09* (2013.01); *H04H 60/06* (2013.01); *H04H 2201/37* (2013.01); *H04H 60/11* (2013.01)

USPC ............ 709/228; 709/235; 709/239; 725/64; 725/66; 725/99

(58) Field of Classification Search
USPC ......................... 709/235, 228; 725/64, 66, 99
See application file for complete search history.

(56) References Cited

U.S. PATENT DOCUMENTS 5,404,505 A    4/1995   Levinson
5,793,975 A    8/1998   Zeldin
(Continued)

FOREIGN PATENT DOCUMENTS

EP    1471744 A1 *  10/2004
FR    2855695 A1    12/2004
(Continued)

OTHER PUBLICATIONS

"U.S. Appl. No. 10/999,209 Non-Final Office Action mailed Oct. 22, 2010", 23 pgs.

(Continued)

*Primary Examiner* — Nicholas Jensen
(74) *Attorney, Agent, or Firm* — Schwegman Lundberg & Woessner, P.A.

(57) ABSTRACT

A system receives a first request for data associated with a data stream received over a first network from a remote source and then determines when the requested data will be available based on analyzing the data stream. The system communicates a second request for the requested data over a second network to the remote source when the requested data will not be available from the data stream within a threshold time and receives the requested data from the remote source over at least one from the list including the first network and the second network.

20 Claims, 8 Drawing Sheets

(51) Int. Cl.
H04H 60/06 (2008.01)
H04H 60/11 (2008.01)

(56) References Cited

U.S. PATENT DOCUMENTS

| | | | |
|---|---|---|---|
| 5,805,825 A * | 9/1998 | Danneels et al. | 709/243 |
| 6,278,716 B1 | 8/2001 | Rubenstein et al. | |
| 6,288,738 B1 | 9/2001 | Dureau et al. | |
| 6,411,616 B1 | 6/2002 | Donahue et al. | |
| 6,427,238 B1 | 7/2002 | Goodman et al. | |
| 6,748,372 B2 * | 6/2004 | Van Loo | 1/1 |
| 6,895,595 B2 | 5/2005 | Goodman et al. | |
| 6,901,453 B1 | 5/2005 | Pritchett et al. | |
| 6,909,726 B1 * | 6/2005 | Sheeran | 370/468 |
| 7,360,233 B2 * | 4/2008 | Russ et al. | 725/118 |
| 8,326,997 B2 | 12/2012 | Orzen | |
| 2002/0046406 A1 | 4/2002 | Chelehmal et al. | |
| 2002/0059623 A1 | 5/2002 | Rodriguez | |
| 2002/0067909 A1 | 6/2002 | Iivonen | |
| 2002/0138848 A1 | 9/2002 | Alao et al. | |
| 2002/0152477 A1 | 10/2002 | Goodman et al. | |
| 2003/0005455 A1 | 1/2003 | Bowers | |
| 2003/0149734 A1 | 8/2003 | Aaltonen et al. | |
| 2003/0217369 A1 | 11/2003 | Heredia | |
| 2004/0055017 A1 | 3/2004 | Delpuch et al. | |
| 2004/0060068 A1 * | 3/2004 | Barbier et al. | 725/109 |
| 2004/0133907 A1 | 7/2004 | Rodriguez et al. | |
| 2004/0139480 A1 | 7/2004 | Delpuch et al. | |
| 2004/0205826 A1 | 10/2004 | Barbier et al. | |
| 2004/0208204 A1 | 10/2004 | Crinon | |
| 2004/0261114 A1 | 12/2004 | Addington et al. | |
| 2005/0044142 A1 | 2/2005 | Garrec et al. | |
| 2005/0138667 A1 | 6/2005 | Delpuch | |
| 2006/0117355 A1 | 6/2006 | Dureau et al. | |
| 2007/0130601 A1 * | 6/2007 | Li et al. | 725/112 |
| 2008/0104643 A1 | 5/2008 | Shao et al. | |

FOREIGN PATENT DOCUMENTS

| | | |
|---|---|---|
| JP | 4782145 | 7/2011 |
| WO | WO-9962248 A1 | 12/1999 |
| WO | WO-0062547 A1 | 10/2000 |
| WO | WO-2004028119 A2 | 1/2004 |
| WO | WO-2006057981 A2 | 6/2006 |
| WO | WO-2006057981 A3 | 6/2006 |

OTHER PUBLICATIONS

"U.S. Appl. No. 10/999,209, Non-Final Office Action mailed Jun. 30, 2008", 27 pgs.
"U.S. Appl. No. 10/999,209, Non-Final Office Action mailed Dec. 16, 2008", 28 pgs.
"U.S. Appl. No. 10/999,209, Response filed Feb. 26, 2009 to Non-Final Office Action mailed Dec. 16, 2008", 15 pgs.
"U.S. Appl. No. 10/999,209, Response filed Sep. 30, 2008 to Non-Final Office Action mailed Jun. 30, 2008", 13 pgs.
"U.S. Appl. No. 10/999,209, Examiner Interview Summary mailed Jul. 15, 2011", 3 pgs.
"U.S. Appl. No. 10/999,209, Final Office Action mailed Mar. 17, 2010", 21pgs.
"U.S. Appl. No. 10/999,209, Final Office Action mailed Mar. 29, 2011", 23 pgs.
"U.S. Appl. No. 10/999,209, Final Office Action mailed May 19, 2009", 30 pgs.
"U.S. Appl. No. 10/999,209, Non Final Office Action mailed Feb. 2, 2012", 23 pgs.
"U.S. Appl. No. 10/999,209, Non Final Office Action mailed Sep. 25, 2009", 19 pgs.
"U.S. Appl. No. 10/999,209, Response filed Aug. 17, 2010 to Final Office Action mailed Mar. 17, 2010", 14 pgs.
"U.S. Appl. No. 10/999,209, Response filed Jan. 24, 2011 to Non Final Office Action mailed Oct. 22, 2010", 13 pgs.
"U.S. Appl. No. 10/999,209, Response filed Dec. 18, 2009 to Non Final Office Action mailed Sep. 25, 2009", 15 pgs.
"U.S. Appl. No. 10/999,209, Response filed Jul. 20, 2009 to Final Office Action mailed May 19, 2009", 16 pgs.
"U.S. Appl. No. 10/999,209, Response filed Sep. 16, 2011 to Final Office Action mailed Mar. 29, 2011", 15 pgs.
"U.S. Appl. No. 11/599,688 , Response filed Sep. 19, 2011 to Non Final Office Action mailed Apr. 20, 2011", 13 pgs.
"U.S. Appl. No. 11/599,688 Non-Final Office Action mailed Oct. 29, 2010", 33 pgs.
"U.S. Appl. No. 11/599,688, Advisory Action mailed Apr. 26, 2010", 3 pgs.
"U.S. Appl. No. 11/599,688, Decision on Pre-Appeal Brief Request mailed Jan. 13, 2012", 2 pgs.
"U.S. Appl. No. 11/599,688, Final Office Action mailed Feb. 3, 2010", 45 pgs.
"U.S. Appl. No. 11/599,688, Final Office Action mailed Oct. 25, 2011", 7 pgs.
"U.S. Appl. No. 11/599,688, Non Final Office Action mailed Jun. 7, 2012", 28 pgs.
"U.S. Appl. No. 11/599,688, Non Final Office Action mailed Apr. 20, 2011", 33 pgs.
"U.S. Appl. No. 11/599,688, Non-Final Office Action mailed Jul. 27, 2009", 40 pgs.
"U.S. Appl. No. 11/599,688, Notice of Allowance/Base Issue Fee mailed Oct. 9, 2012", 7 pgs.
"U.S. Appl. No. 11/599,688, Response filed Jan. 31, 2011 to Non Final Office Action mailed Oct. 29, 2010", 15 pgs.
"U.S. Appl. No. 11/599,688, Response filed Apr. 5, 2010 to Final Office Action mailed Mar. 3, 2010", 15 pgs.
"U.S. Appl. No. 11/599,688, Response filed Sep. 7, 2012 to Non Final Office Action mailed Jun. 7, 2012", 13 pgs.
"U.S. Appl. No. 11/599,688, Response filed Oct. 27, 2009 to Non Final Office Action mailed Jul. 27, 2009", 14 pgs.
"Australian Application Serial No. 2005309706, Amendment filed Oct. 2, 2009", 4 pgs.
"Australian Application Serial No. 2005309706, Examination report mailed Sep. 30, 2008", 2 pgs.
"Australian Application Serial No. 2005309706, Preliminary Amendment filed Feb. 1, 2008", 21 pgs.
"Australian Application Serial No. 2005309706, Response filed Sep. 28, 2009 to Office Action mailed Sep. 30, 2008", 20 pgs.
"European Application Serial No. 05849684.5, Office Action mailed Aug. 27, 2010", 7 pgs.
"European Application Serial No. 05849684.5, Response filed Jan. 5, 2010 to Extended European Search Report mailed Oct. 6, 2009", 7 pgs.
"European Application Serial No. 05849684.5, Response filed Mar. 4, 2011", 10 pgs.
"European Application Serial No. 05849684.5, Extended European Search Report mailed Oct. 6, 2009", 9 pgs.
"International Application Serial No. PCT/US2005/042227, International Preliminary Report on Patentability mailed Oct. 18, 2007", 7 pgs.
"International Application Serial No. PCT/US2005/042227, International Search Report and Written Opinion mailed Sep. 25, 2007", 10 pgs.
"Japanese Application Serial No. 2007-543380, Final Office Action mailed Feb. 8, 2011", with English translation of claims, 6 pgs.
"Japanese Application Serial No. 2007-543380, Office Action mailed Jun. 15, 2010", with English translation of claims, 8 Pgs.
"Japanese Application Serial No. 2007-543380, Response Filed Nov. 30, 2010", 10 pgs.
"Japanese Application Serial No. 2007-543380, Response Filed May 16, 2011", with English translation of claims, 27 pgs.
"Japanese Application Serial No. 2007-543380, Notice of Allowance mailed Jun. 7, 2011", 6 pgs.

* cited by examiner

US 8,938,546 B2

DATA RETRIEVAL IN A TWO-WAY NETWORK

RELATED APPLICATION

This application is a continuation of and claims the benefit of priority under 35 U.S.C. §120 to U.S. patent application Ser. No. 11/599,688, filed on Nov. 15, 2006 and issued on Dec. 4, 2012 as U.S. Pat. No. 8,326,997, which is hereby incorporated by reference herein in its entirety.

TECHNICAL FIELD

An embodiment of the present invention relates generally to the field of electronic communications, and, more specifically, to data retrieval in a two-way interactive television network.

BACKGROUND

Interactive television systems operate to enhance the experience of a content consumer in a number of ways. Content producers and/or distributors are able to provide enhanced services and features to a consumer. For example, interactive television systems may be capable of executing interactive television (iTV) applications that supplement and enhance the viewing experience of a user. A wide range of interactive television applications may be provided to a user via an interactive television system, ranging from electronic program guides (EPGs) to games and the like.

An interactive television application and its associated data are typically delivered from a headend of a broadcast service provider to a set-top box (STB) of a consumer as part of a broadcast transmission. At the user end, a user device (e.g., the set-top box (STB)) receives the broadcast, extracts the interactive portion thereof, and composes and executes one or more interactive television applications that are embodied in the interactive portion of the broadcast. Data for an application is typically received in a cyclical fashion. In some cases, a user of the device may have long lag times between requesting the data and receiving the data. The lag time depends on where the requested data is in relation to the current data in the cycle. Consequently, unpredictable lag times may lead to an unsatisfactory user experience.

SUMMARY OF THE INVENTION

In one embodiment, a receiver system (e.g., a set-top box) receives a first request for data associated with a data stream received over a first network from a remote source system (e.g., a headend). The receiver system may then determine a wait time of when the requested data will be available based on analyzing the data stream. In one embodiment, if the wait time is expected to be longer than a threshold time the receiver system communicates a second request for the data to the remote source over a second network.

In one embodiment, a remote source system collects metric data associated with requests from a receiver system for first data made over a second network. The request may be made when the first data cannot be communicated in a data stream from the remote source over a first network within a first threshold value. The source system compares how many requests for the first data are received to a second threshold value and accordingly adjusts the data stream to provide the first data within the first threshold value.

Other features will be apparent from the accompanying drawings and from the detailed description that follows.

BRIEF DESCRIPTION OF THE DRAWINGS

An exemplary embodiment of the present invention is illustrated by way of example and not limitation in the figures of the accompanying drawings, in which like references indicate the same or similar elements and in which.

DETAILED DESCRIPTION

A method and a system for pushing content in a two-way interactive television network environment are described. In the following description, for purposes of explanation, numerous specific details are set forth in order to provide a thorough understanding of the present invention. It will be evident, however, to one skilled in the art that the present invention may be practiced without these specific details.

Figure 1A:
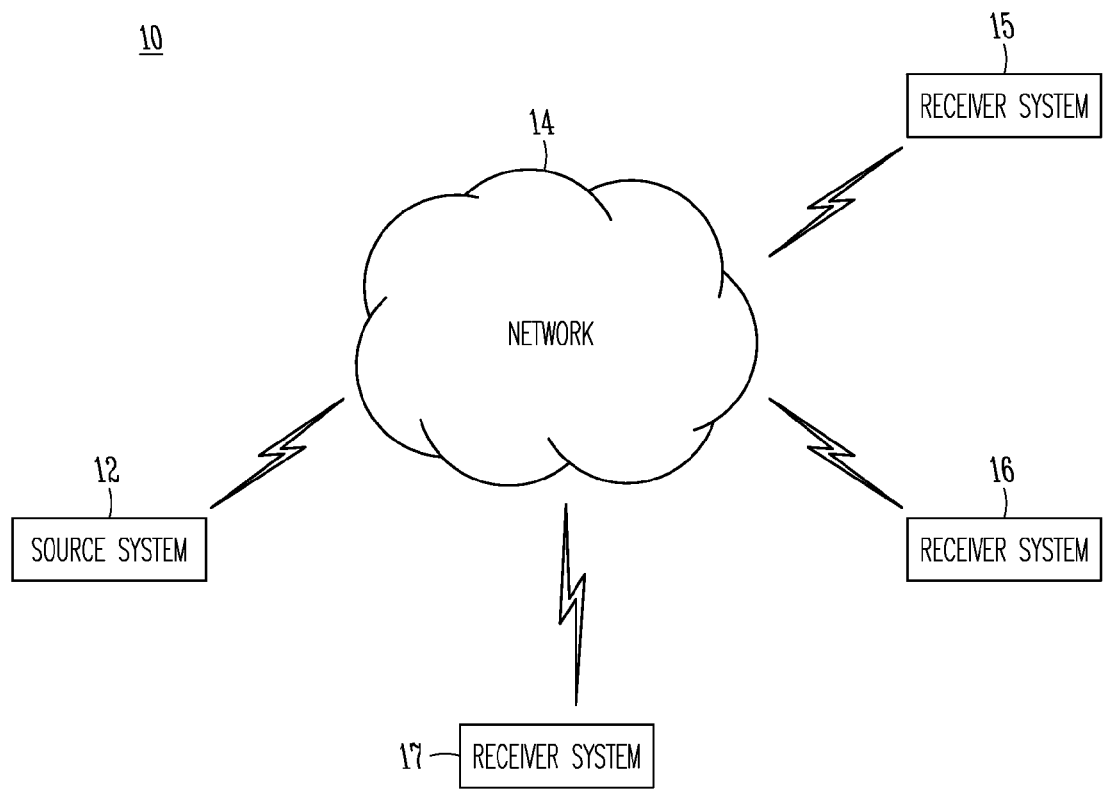
FIG. 1A is a diagrammatic representation of an exemplary interactive television environment within which the present invention may be deployed.
Figure 1B:
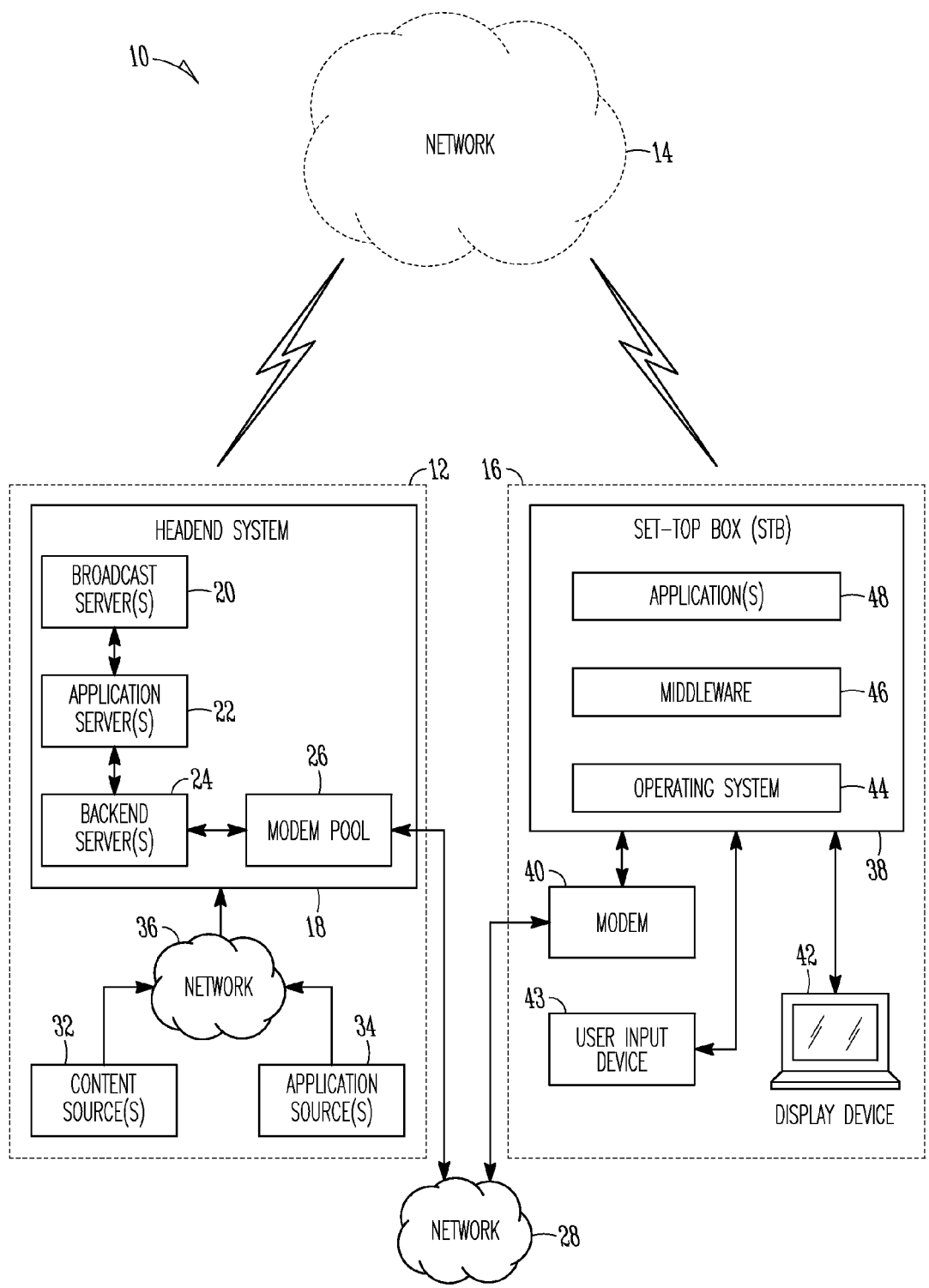
FIG. 1B is a diagrammatic representation of the interactive television environment illustrating exemplary details of the source system and the receiver system.

FIG. 1A is a diagrammatic representation of an exemplary interactive television environment 10, in conjunction with which the present invention may be deployed. The interactive television environment 10 includes a source system 12 that communicates data (e.g., television content and interactive application data) via a distribution system 14 to a number of receiver systems 15, 16, and 17. It will be appreciated that the distribution system 14 may be any communication system capable of communicating data and may, for example, include a national or local Telco network or the like. FIG. 1B is a diagrammatic representation of the interactive television environment 10 illustrating exemplary details of the source system 12 and the receiver system 16.

Turning first to the source system 12, a headend system 18 operates to communicate the data as a broadcast transmission. To this end, the headend system 18 is shown to include one or more broadcast servers 20 and one or more application servers 22. Each of the broadcast servers 20 may operate to receive, encode, packetize, multiplex, and broadcast data from various sources and of various types. In various embodiments, data could also be transmitted from the source system 12 via a network connection to the receiver system 16. Further details regarding an exemplary broadcast server 20 are provided below with reference to FIG. 2A.

Each application server 22, in one exemplary embodiment, serves to compile and provide modules to the broadcast server 20. The modules may include application code, data (e.g., updated statistics and scores for sporting events, news feeds, etc.), or any other data (e.g., motion picture experts group (MPEG) still pictures, etc.) utilized by an interactive television application. The modules of the present invention may be portable across all transmission media and, accordingly, may contain no specialization for any particular communication channel. A module may be signed, unsigned, compressed or uncompressed. An application server 22 may include multiplexing functionality to enable multiplexing of, for example, interactive television applications and associated data with audio and video signals received from various sources. An application server 22 may also have the capability to feed (e.g., stream) a multitude of code, data, and index modules (e.g., interactive television application modules) to one or more broadcast servers 20 for distribution to the receiver system 16. To this end, each application server 22 may include a carousel 23 (See FIG. 2A), whereby code and data modules are provided to a broadcast server 20 in a cyclic, repetitive manner for inclusion within a transmission from the headend system 18.

The headend system 18 is also shown to include one or more backend servers 24, which are coupled to the application servers 22 and to a communications I/O interface such as an exemplary modem pool 26. Specifically, the modem pool 26 is coupled to receive data from the receiver systems 16 via a network 28 (e.g., a return channel such as the Internet) and to provide this data to backend servers 24. The backend servers 24 may then provide the data, received from the receiver system 16, to the application servers 22 and the broadcast servers 20. Accordingly, the network 28 and the modem pool 26 may operate as a return channel whereby a receiver system 16 is provided with interactivity with the source system 12. Data provided to the headend system 18 via the network 28 may include, for example, user input to an interactive television application executed at the receiver system 16 or data that is generated by the receiver system 16 and communicated to the source system 12.

Additionally, data may be provided from the headend system 18 to the receiver system 16. For example, as discussed below, if either the receiver system 16 or the headend system 18 determines the receiver system 16 will have to wait too long to receive one or more specific data modules, the receiver system 16 may provide the data module(s) via the network 28. In another embodiment, a second receiver system 16 may request one or more data modules which the headend system 18 in response multicasts the module(s) making the data available to the requesting receiver in addition to any other receivers (e.g., the first receiver system 16) needing the same module(s).

Within the source system 12, the headend system 18 is also shown optionally to receive data (e.g., content, code and application data) from external sources. FIG. 1B illustrates the headend system 18 as being coupled to one or more content sources 32 and one or more application sources 34 via a network 36 (e.g., the Internet). For example, a content source 32 could be a provider of entertainment content (e.g., movies), or a provider of real-time dynamic data (e.g., weather information). An application source 34 may be a provider of any interactive television application. For example, one or more application sources 34 may provide Electronic Program Guides (EPG) and navigation applications, messaging and communication applications, information applications, sports applications, and/or games and gaming applications.

Turning now to the distribution system 14, the distribution system 14 may, in one embodiment, support the broadcast distribution of data from the source system 12 to the receiver system 16. The distribution system 14 may include a satellite, cable, terrestrial or Digital Subscribers Line (DSL) network, or any combination of such networks or other networks well known to those of ordinary skill in the art.

The receiver system 16 is shown, in one exemplary embodiment, to include a set-top box (STB) 38 that receives data via the distribution system 14, a communications I/O interface such as an exemplary modem 40 for return channel communications with the headend system 18 and optionally other external systems, a user input device 43 (e.g., a keyboard, remote control, mouse etc.) and a display device 42, coupled to the set-top box 38, for the display of content received at the set-top box 38. In one exemplary embodiment, the display device 42 may be a television set. It will be appreciated that the communications I/O interfaces may be selected dependent upon the nature of the network 28. For example, the network 28 may include a cable return module, a DSL return module, or the like.

The set-top box 38 may execute three layers of software, namely an operating system 44, middleware 46 and one or more interactive television applications 48. The middleware 46 operates to shield the interactive television application 48 from the differences of various operating systems 44 and in hardware of different set-top boxes 38. To this end, the middleware 46 may provide driver Application Program Interfaces (APIs) and a library to translate instructions received from an interactive television application 48 into low-level commands that may be understood by set-top box hardware (e.g., modems, interface ports, smart card readers, etc.).

Figure 2A:
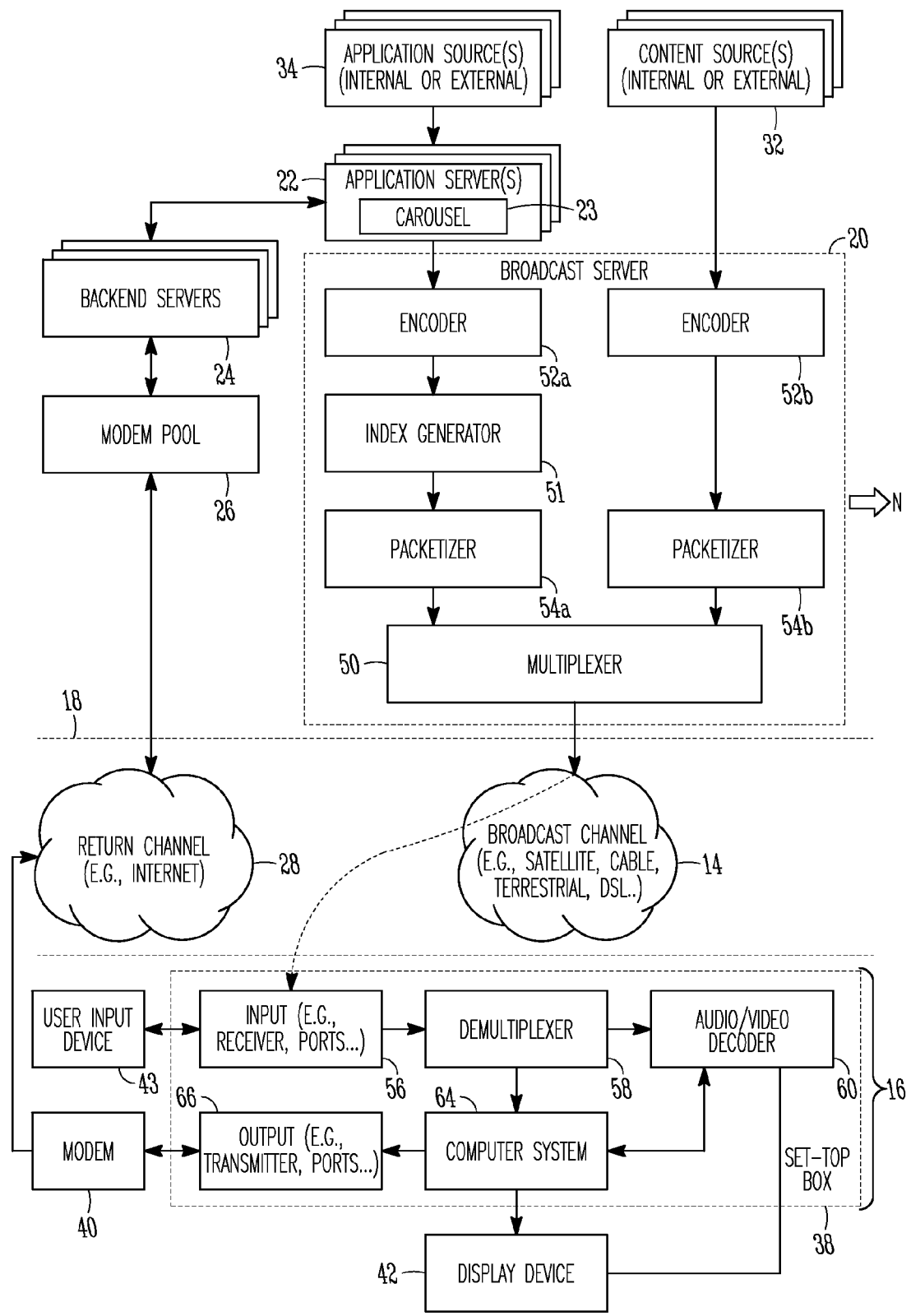
FIG. 2A is a block diagram providing architectural details regarding a headend system and a set-top box, according to an exemplary embodiment of the present invention.

FIG. 2A is a block diagram illustrating further details regarding an example embodiment of architecture of a headend system 18 and a set-top box 38. The components and associated computer implemented methodologies and operations of the example architecture may be used in various embodiments to perform any one or more of the method and operations discussed herein and specifically with respect to FIGS. 3A to 3C.

FIG. 2A illustrates a broadcast server 20, which may support a variety of data modules associated with a carousel 23 of an application server of the application servers 22. As shown, a number of parallel paths provide input to a multiplexer 50, each of the parallel paths include an encoder 52 and a packetizer 54. Each encoder 52 may operate to receive input from one or more sources. For example, the encoder 52a is shown to receive streamed code modules from the application servers 22, which is in turn coupled to receive application data from one or more application sources 34. The application sources 34 may be internal or external to a headend system 18. Similarly, an encoder 52b is shown coupled to receive content data from one or more content sources 32, which may again be internal or external to the headend system 18.

It will be appreciated that each broadcast server 20 may include any number of parallel paths coupled to any number of sources (e.g., application and/or content sources 34 and 32, respectively) that provide input to the multiplexer 50. Furthermore, a headend system 18 may deploy any number of broadcast servers 20.

In one embodiment at least of portion of the data loaded into the carousel 23 is program guide data. For example, the program guide data may be a 30 day guide composed of individual modules, one for each day of data, or each day's programming may be divided into multiple modules. The modules may include various module data types, such as directory modules, code modules, and data modules. The guide may cycle through all modules associated with the 30 day guide at a particular frequency (e.g., two data modules per second), which may be derived from a bandwidth allocated for the application source 34. For example, 4 Mbs (megabits per second) may be allocated for the application source 34 and 16 Mbs allocated for the content source 32 for an output bandwidth of 20 Mbs from the multiplexer 50. Thus, based on the size of each module (e.g., in bits) and the bandwidth (bit rate) the carousel frequency, according to one embodiment, may be determined on a per module basis.

Figure 2B:
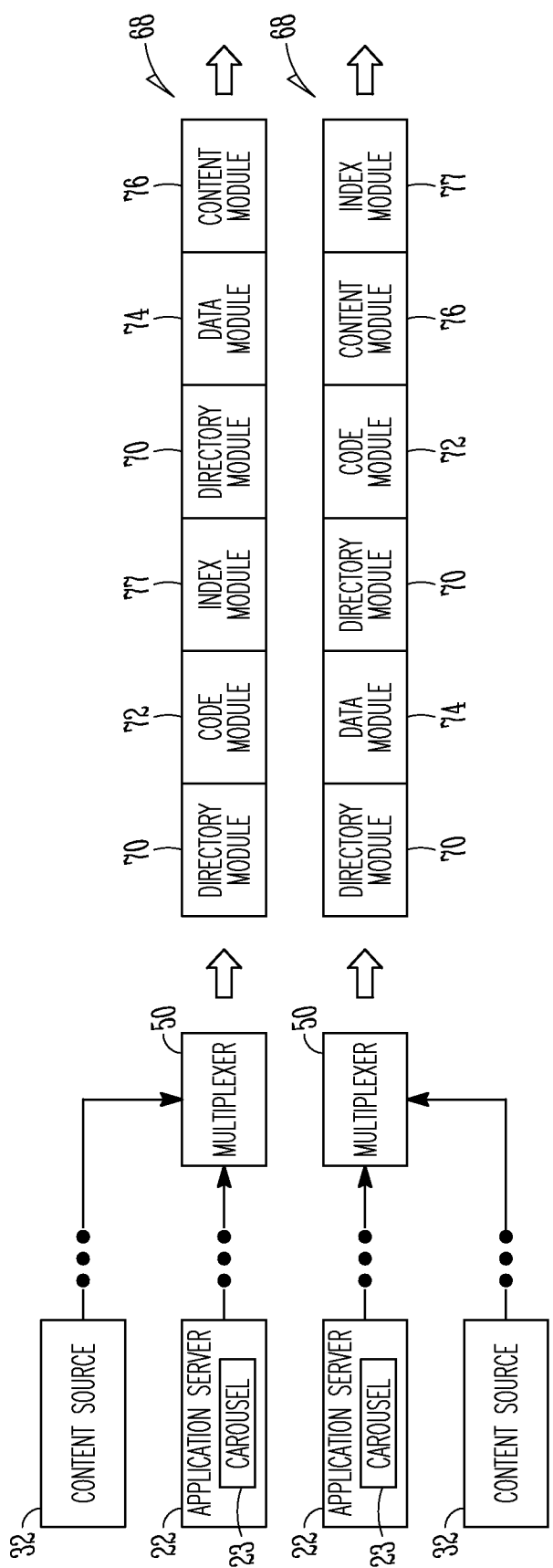
FIG. 2B is a diagrammatic representation of a data stream that may be outputted from a multiplexer of a headend system, according to one embodiment of the present invention.

In one embodiment, an index generator 51 may be used in conjunction with module configuration data and carousel data to create one or more index modules (e.g., see FIG. 2B). The one or more index modules may describe a configuration and/or attributes associated with the carousel. For example, these may include one or more of the following: the length of the carousel (e.g., the total number of modules in the carousel), an index (or order) of the modules, the carousel frequency (e.g., modules/sec), module data types, module identifiers, the bandwidth allocation for the application source (e.g., carousel), etc.

The bandwidth allocation for the application source 34 (carousel frequency) and the content source 32, according to one embodiment, may be dynamically adjusted based on metrics communicated from, processed, and/or derived from components and data of the interactive television environment 10, such as receiver systems 15, 16, 17 and source system 12. Additionally, some or all of the modules (e.g., the index module) may be updated based on changes to the carousel (e.g., frequency and the length of the carousel). In another embodiment, the order of the packets or the frequency of the packets may be adjusted. For example, the system may detect user's (STBs) are accessing guide data for day 8 (of a 30 day carousel) more often than expected, which may result in a spike in on-line requests that exceeds a threshold value. The carousel may then be restructured to deliver the data in an order that includes a higher occurrence (frequency) of day 8 (e.g., day 1, 2, 8, 3, 4, 8, 5, 6, 8).

Each of the encoders 52 operates to encode data utilizing any one or more of a number of compression algorithms, such as, for example, the Motion Picture Expert Group (MPEG) comparison algorithms. Each of the encoders 52 may also operate to time stamp data that needs to be encoded. Time stamps may also be adjusted downstream by multiplexers. Certain data types may not be susceptible to encoding and thus, may pass through, or by-pass, the encoder 52, and be provided to a packetizer 54 in an unencoded state. In one embodiment, code and most data types may bypass the encoders 52.

The packetizers 54 are coupled to receive data and to format this data into packets before eventual transmission via the distribution system 14 (e.g., a broadcast channel). Each of the packetizers 54 may provide packets to the multiplexer 50, which may multiplex the packets into a transmission signal for distribution via the distribution system 14.

In one embodiment, the set-top box 38 of a receiver system (e.g., receiver system 16) is coupled to a network input (e.g., modem 40), cable input, satellite dish or antenna so as to receive a data stream or transmission signal transmitted from the headend system 18 via the distribution system 14. The transmission signal is then fed to an input 56 (e.g., a receiver, port, etc.). Where the input 56 includes a receiver, the input 56 may, for example, include a tuner (not shown) that operates to select a broadcast channel on which the transmitted signal is broadcast. It will be appreciated that in a DSL environment no tuner may be provided. The packetized transmission signal is then fed from the input 56 to a demultiplexer 58 that demultiplexes the application and content data that constitutes the transmission signal. Specifically, the demultiplexer 58 provides the content data to an audio and video decoder 60, and the application data to a computer system 64. The audio and video decoder 60 decodes the content data into, for example, a television signal. For example, the audio and video decoder 60 may decode the received content data into a suitable television signal such as a National Television Systems Committee (NTSC), Phase Alternation Line (PAL), or High Definition Television (HDTV) signal. The television signal is then provided from the audio and video decoder 60 to the display device 42.

The computer system 64, which may include a processor and memory, reconstructs one or more interactive television applications from the application data that is provided to it by the demultiplexer 58. As mentioned above, the application data may include both application code and/or application information that is used by an interactive television application 48. The computer system 64, in addition to reconstructing an interactive television application 48, executes the interactive television application 48 to cause the set-top box 38 to perform one or more operations. For example, the computer system 64 may output a signal to the display device 42. For example, this signal from the computer system 64 may constitute an image or graphical user interface (GUI) to be overlaid on an image produced as a result of the signal provided to the display device 42 from the audio and video decoder 60. A user input device 43 (e.g., a keyboard, remote control, mouse, microphone, camera etc.) is also shown to be coupled to the input 56, so as to enable a user to provide input to the set-top box 38. Such input may, for example, be alphanumeric, audio, video, or control (e.g., manipulation of objects presented in a user interface) input.

The computer system 64 is also shown to be coupled to the audio and video decoder 60 so as to enable the computer system 64 to control the video decoder 60. The computer system 64 may also receive an audio and/or video signal from the video decoder 60 and combine this signal with generated signals so as to enable the computer system 64 to provide a combined signal to the display device 42.

The computer system 64 is also shown to be coupled to an input/output (I/O) 66 (e.g., a transceiver, I/O ports, etc.) through which the set-top box 38 is able to provide output data and receive input data, via the network 28, to and from an external system, such as for example, the headend system 18. To this end, the I/O 66 is shown to be coupled to the modem 40 of the receiver system 16.

While the receiver system 16 is shown in FIGS. 1A, 1B and 2A to include a set-top box 38 coupled to a display device 42, it will be readily appreciated that the components, including the software or processing modules, of the receiver system 16 may be combined into a single device (e.g., a computer system) utilizing one (or) more processing modules or could be distributed among a number of independent systems. For example, a separate receiver unit may provide input to a set-top box 38, which is then coupled to a display device 42.

FIG. 2B is a diagrammatic representation of an exemplary data stream 68 that may, according to one embodiment, be the output from one or more multiplexers 50 deployed in one or more headend systems, such as headend system 18. In the example interactive television environment 10, the application and content data may be presented to a broadcast server 20 as distinct modules. For example, the application data may constitute directory modules 70, code modules 72, data modules 74, and in some embodiments, index modules 77. The content information may be included within content modules 76. In one embodiment, no distinction may be made between code and data modules and thus may be mixed.

In another embodiment, each of the modules 70-77 is uniquely identified as being a particular module type. A directory module 70 may have a unique identifier so as to enable it to be identified within a data stream 68 without further information. A directory module 70 may contain information constituting a directory of one or more other modules such as code modules 72 and data modules 74 that form a particular interactive television application. Accordingly, a set-top box 38 may utilize a directory module 70 to identify all code modules 72 and/or data modules 74 that are required for assembling and executing an interactive television application.

In one embodiment, the directory module 70 may be accessed and processed prior to the other modules, so as to enable the set-top box 38 to correctly identify and interpret other modules included within a data stream 68. In another embodiment, the directory module 70 is used to retrieve a list of modules as well as flags attached for each module, for example, to specify whether a module is auto-exec or auto-load module. As mentioned above, a headend system 18 via the application server 22 may implement the carousel 23 whereby the modules 70-76 are transmitted in a cyclic, repetitive manner.

In one embodiment, the set-top box 38 may utilize the index module 77 to provide information pertaining to parameters associated with receiving the modules. For example, the index module may contain data associated with the carousel 23, the data may include one or more of the length of the carousel, an index (or order) of the modules (e.g., by date, numerical value, etc.), current module number and/or module identifier (e.g., date, name, etc.), the carousel frequency (e.g., modules/sec), the bandwidth allocation for the application source (e.g., carousel), etc. In one embodiment, the module identifier may be mapped to an index number associated with the total number of modules (e.g., the length of the carousel). For example, the total number of modules may be 1000 and each module has a unique index number ranging from 0 to 999. The index number may be associated (e.g., by a table) to a module identifier. For example, the module identifier may be a stock symbol associated with the index number 500 (of 999), which may correspond to a data module including information pertaining to the stock symbol (e.g., price, etc.). In another embodiment the module identifier may be a date or day number associated with program guide data pertaining to a twenty four hour period. For example, a module identifier "15" may be the programming data associated with the 15$^{th}$ day of 30 days of modules in the carousel 23. In this example, the index number may be the module identifier. However, it can be appreciated that a day of programming (or any other data) may be divided into two or more modules each of which may have a unique index number. In another embodiment, an index number may be associated with more than one module.

The set-top box may analyze and determine how the modules are related to each other and/or how the modules are associated with their respective index number(s). In one embodiment this includes analyzing the inherent structure of the data. For example, if a 30 day program guide data is comprised of 1000 modules and provided in chronological order the set-top box can infer that data for day 15 can be found in the 500$^{th}$ module.

Figure 3A:
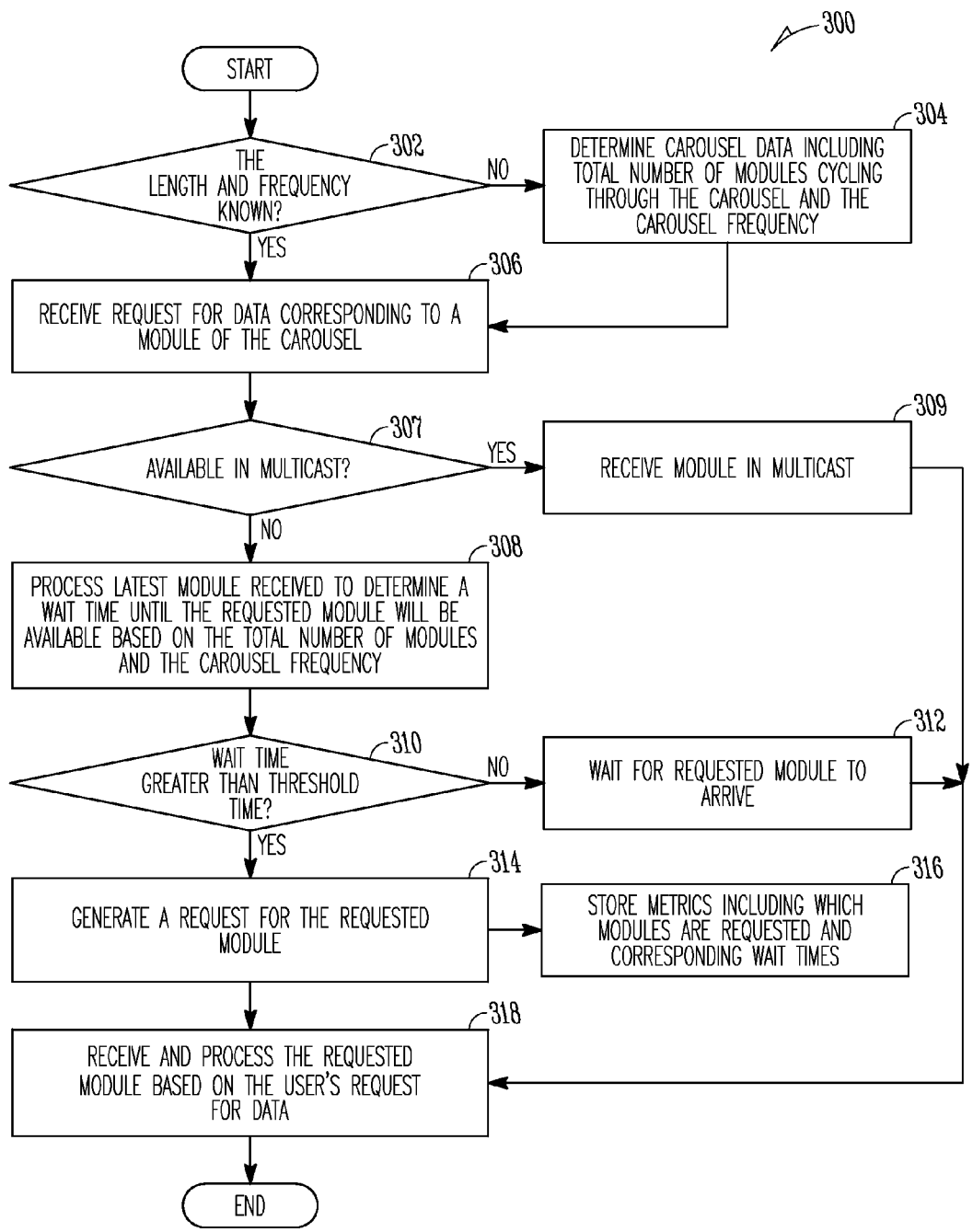
FIGS. 3A-3C are flowcharts illustrating example embodiments for determining whether to generate a request for a specific module.
Figure 3B:
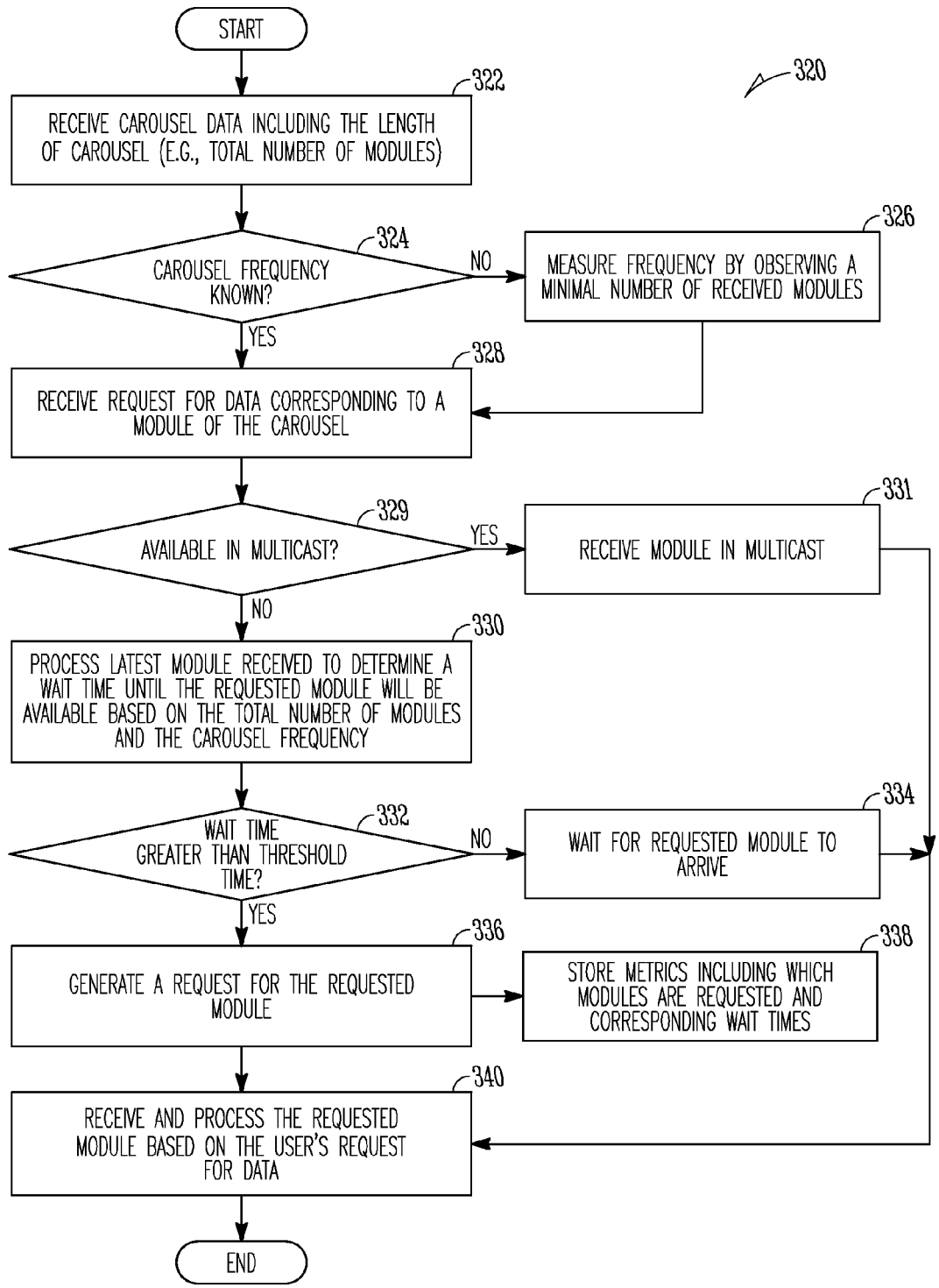
Figure 3C:
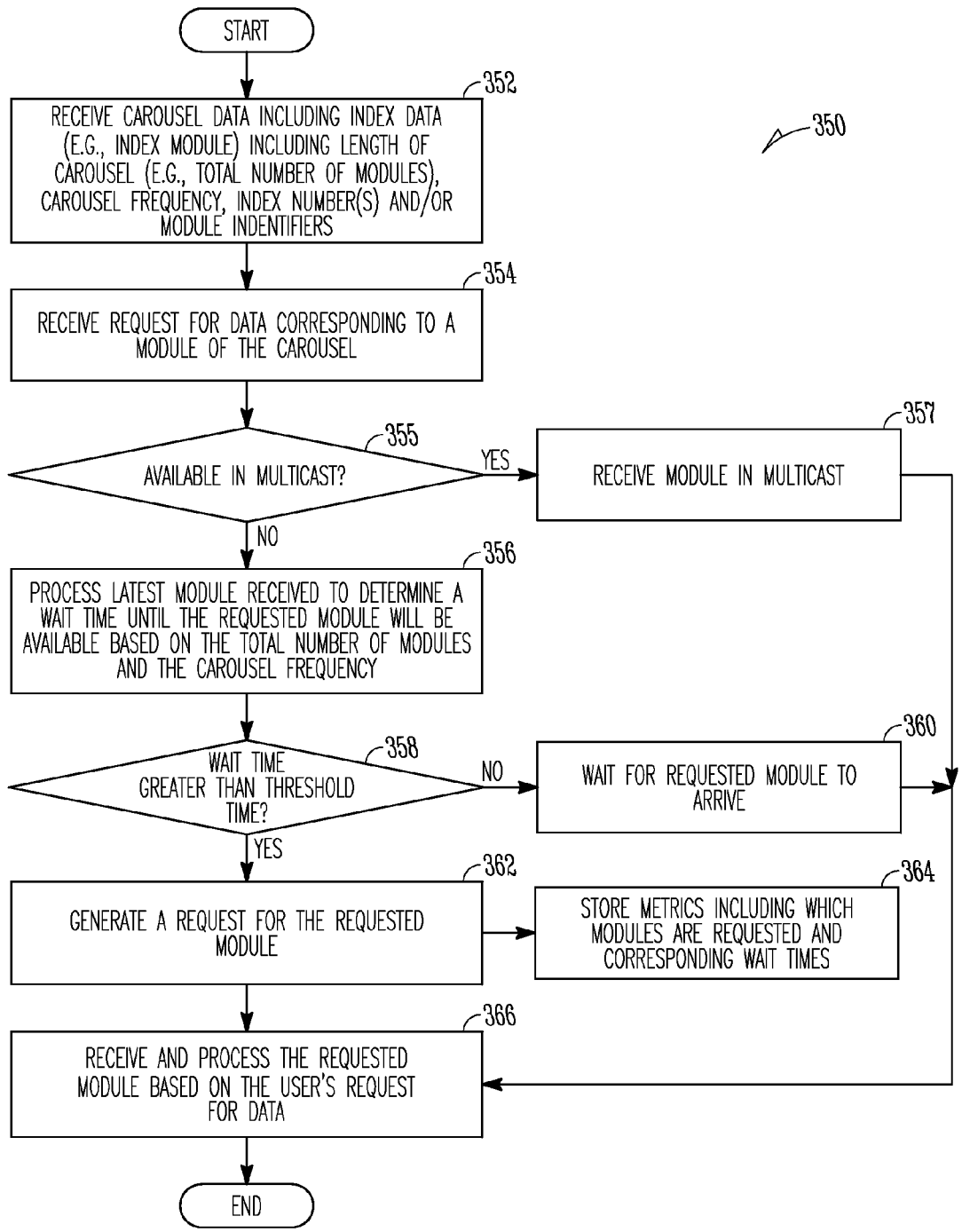

In one embodiment, a receiver system (e.g., receiver system 16) may receive a user request to access or display data (e.g., program guide data or stock symbol data) associated with one or more modules originating from the carousel 23. FIGS. 3A-3C are flow charts of example embodiments for receiving and processing such a request and deciding whether or not to make a request for the modules associated with the requested data from the source system 12. Accordingly, components of the receiver system 16, such as the components associated with the set-top box 38 may be utilized to perform any or all of the methods and operations as described below with respect to FIG. 3A to 3C.

FIG. 3A is a flowchart of a method 300 illustrating an example embodiment for determining whether a receiver is to generate a request for a specific module. In one embodiment, the receiver system (e.g., the receiver system 16) determines at operation 302 if the length of the carousel (e.g., total number of modules of the carousel) and the frequency of the carousel are currently known by the receiver. If not, at operation 304, the receiver determines carousel data including but not limited to the length of the carousel, repeated modules, and a carousel frequency. In one embodiment, the carousel data may be determined by observing a complete cycle of the carousel (modules) to determine the length of the carousel, repeat modules, and to determine carousel frequency. In other embodiments, the receiver system may receive a command from a source system (e.g., source system 12) to perform the operation 304 or the receiver system may perform operation 304 at configurable intervals.

In one embodiment, the receiver may determine when the modules begin to repeat based on a marker, such as a module identifier or index number associated with each module. The frequency may be determined by a simple calculation based on how many modules are received per measure of time.

Once the length of the carousel and carousel frequency are known, at operation 306, the receiver then receives a request for data associated with one or more of the modules of the carousel. For example, the receiver may receive as a request interactive input from a user via a remote control. At operation 307 if the data (e.g., modules) is available in a previous multicast (e.g., in response to another receiver's request to the headend system) the receiver obtains the data at operation 309 and accordingly processes the module at operation 318. If, at operation 307, the data is not available in a previous multicast the receiver, at operation 308, processes the latest module received to determine a wait time until the requested module(s) will be available based on the carousel data. For example, if the carousel length is 100, the current (or last) module received was module 50 (an ascending order), and the requested module is module 10, the receiver may then calculate a delta time difference (hereinafter, "delta") between the current module and requested module of 60 modules (100−50+10). The delta divided by the carousel frequency (e.g., modules/sec) will be an approximate wait time until the receiver receives the requested module associated with the requested data. In other embodiments the request of operation 306 may be received prior to determining the length and frequency of the carousel at operation 304. Additionally, the system may check if the data is available in a multicast as discussed with respect to operation 307 after the operation to determine the wait time at operations 308 and 310.

In another embodiment, the receiver may determine some or all of the modules repeat in the cycle and determine the delta accordingly. Assuming the same parameters as the above example except the requested module repeats at 75 and at 10. In this case, the delta is 25 (75−50).

In yet another embodiment, wait time data may be derived based on the ordered, sequenced or hierarchical nature of the data itself and a module identifier (e.g., date, ticker symbol, etc.). For example, the guide data and associated packets are delivered in chronological order by date. Consequently, a request for program guide data 10 days from the current date may be interpreted as having a wait time corresponding to a number of modules 10 days upstream from the current module. In another example, module identifiers correspond to ticker symbols and are alphabetical. If the current identifier (module) is at AAA and a request for MMM is received, the wait time may be estimated as the number of modules corresponding to half way through the alphabet or approximately half a carousel. In either example, knowing the carousel frequency (module/sec) or total time to cycle through one carousel, a wait time may be calculated and compared to a threshold value to determine whether or not to make an online request, as discussed in further detail below.

It can be appreciated in various embodiments the request may be received during or prior to operation 304 being performed for the first time or performed again in an update. In these cases either an error may be returned to the user (e.g., via display device 42) or the processing of the request may be delayed until operation 304 is complete or the STB may be configured to choose one of the access paths by default (e.g., when no information is available automatically request the data online).

Returning to the flowchart of method 300, at operation 310 the wait time is compared to a threshold time. In various embodiments, the threshold time may be periodically provided and updated by the source system (e.g., headend system 18 of source system 12) or may be manually configurable at the receiver. If the wait time is below the threshold the receiver waits for the requested module to arrive at operation 312. If the wait time exceeds the threshold value, at operation 314, the receiver generates a request to be communicated back to the source system, which requests the module(s) be communicated via an alternative source and/or network other than the carousel. In various embodiments, the alternate source may be a backend server system (e.g., backend servers 24) in communication with an application server system (e.g., application server 22) and the network may be a dedicated back channel (e.g., network 28—Internet, etc.) or the broadcast channel network (e.g., broadcast channel 14—satellite, cable, etc.). At operation 316, the receiver may store metrics including which modules are requested and corresponding wait times. In one embodiment, the receiver periodically or upon request from the source system communicates the metrics to the source system to be evaluated along with a multitude of metrics received from other receivers to evaluate performance and determine if adjustments may improve performance of the overall system (e.g., interactive television environment 10). For example, it may be determined that specific modules are requested more often and the carousel may be modified to repeat these modules within the cycle, or that the overall system may benefit by increasing the carousel frequency (e.g., allocate more bandwidth to the application source 34).

Additionally, along with being collected at the STB data may be collected independently or contemporaneously at the server side (e.g., source system 12). For example, if a lot of requests for program guide data for day 8 are received at the server, the server may make adjustments (e.g., carousel frequency, etc.) without direct feedback from the STBs.

Returning to the method 300, at operation 318 the receiver system receives and processes the requested module and provides the requested data as requested in operation 306. In one embodiment, the requested data (e.g., module(s)) is received in a multicast form the headend system 18, thus making the requested data available to other receivers communicatively coupled to the headend system 18.

The examples and alternate embodiments discussed above with reference to FIG. 3A also apply to the embodiments described below with respect to FIGS. 3B and 3C and thus in the interest of simplicity will not be duplicated below.

FIG. 3B is a flowchart of a method 320 illustrating an example embodiment for determining whether to generate a request for specific data (e.g., module(s)). In one embodiment, the receiver system (e.g., the receiver system 16) receives at operation 322 carousel data, which includes the length of the carousel (e.g., total number of modules of the carousel). In one embodiment, the receiver may request all or a portion of the carousel data or the source system may periodically communicate all or a portion of the carousel data via a network, such as in a module (e.g., index module 77) via the network 28 or packet data via the distribution system 14 (e.g., the Internet).

At operation 324 the receiver determines if the carousel frequency is known. If not, at operation 326, the receiver determines the carousel frequency. In one embodiment, the frequency may be determined by a simple calculation based on how many modules are counted per measure of time (e.g., modules/second). In other embodiments, the receiver system may receive a command from a source system (e.g., source system 12) to perform the operation 326 or the receiver system may perform operation 326 at configurable intervals. In one embodiment, the receiver may be able to determine when the modules begin to repeat based on a marker, such as a module identifier or index number associated with each module.

Once the carousel frequency has been determined (or if known), at operation 328, the receiver then receives a request for data associated with one or more of the modules of the carousel. At operation 329 if the data (e.g., modules) is available in a previous multicast the receiver obtains the data at operation 331 and accordingly processes the module at operation 340. If, at operation 329, the data is not available in a previous multicast the receiver, at operation 330, processes the latest module received to determine a wait time until the requested module(s) will be available based on carousel data, which includes the length of the carousel, derived delta (see above), and the carousel frequency. It is to be appreciated the request may be received during or prior to operation 326 being performed for the first time or performed again in an update. In these cases either an error may be returned to the user (e.g., via display device 42) or the processing of the request may be delayed until operation 326 is complete or the STB may be configured to choose one of the access paths by default (e.g., when no information is available automatically request the data online). Additionally, the system may check if the data is available as discussed with respect to operation 329 after the operations to determine the wait time at operations 330 and 332.

At operation 332, the wait time is compared to a threshold time. In various embodiments, the threshold time may be periodically provided and updated by the source system (e.g., headend system 18 of source system 12) or may be manually configurable at the receiver. If the wait time is below the threshold the receiver waits for the requested module to arrive at operation 334. If the wait time exceeds the threshold value the receiver at operation 336 generates a request to be communicated back to the source system. The request requests the module(s) be communicated to the receiver via an alternative source and/or network other than the carousel. In various embodiments, the alternate source may be a backend server system (e.g., backend servers 24) in communication with an application server system (e.g., application server 22) and the network may be a dedicated back channel (e.g., network 28—Internet, etc.) or the broadcast channel network (e.g., distribution system 14—satellite, cable, etc.).

At operation 338, the receiver may store metrics including which modules are requested and corresponding wait times. In one embodiment, the receiver periodically or upon request from the source system communicates the metrics to the source system to be evaluated along with a multitude of metrics received from other receivers to evaluate performance and determine if adjusts may improve performance of the overall system (e.g., interactive television environment 10). For example, it may be determined that specific modules are requested more often and the carousel may be modified to repeat these modules within the cycle or that the overall system may benefit by increasing the carousel frequency (e.g., allocate more bandwidth to the application source 34).

Returning to the method 320, at operation 340 the receiver system receives and processes the requested module and provides the requested data as requested in operation 328.

FIG. 3C is a flowchart of a method 350 illustrating an example embodiment for determining whether to generate a request for a specific module. In one embodiment, the receiver system (e.g., receiver system 16) receives at operation 352 carousel data, which may include some or all but is not limited to, index data, the length of the carousel (e.g., total number of modules of the carousel), carousel frequency, and module identifiers. In one embodiment, the receiver may request all or a portion of the carousel data or the source system may periodically communicate all or a portion of the carousel data via a network, such as in a module (e.g., index module 77) via the network 28 or packet data via the broadcast channel 14 (e.g., the Internet).

At operation 354, the receiver then receives a request for data associated with one or more of the modules of the carousel. At operation 355 if the data (e.g., modules) is available in a previous multicast (e.g., in response to another receiver's request to the headend system) the receiver obtains the data at operation 357 and accordingly processes the module at operation 366. If, at operation 307, the data is not available in a previous multicast the receiver, at operation 356, processes the latest module received to determine a wait time until the requested module(s) will be available based on carousel data, which includes the length of the carousel, derived delta, and the carousel frequency. It is to be appreciated the request may be received during or prior to receiving the latest carousel data at operation 352. In this case either an error may be returned to the user (e.g., via display device 42) or the processing of the request may be delayed until the data has been received. Additionally, the system may check if the data is available in a multicast as discussed with respect to operation 329 after the operation to determine the wait time at operations 356 and 358, At operation 358, the wait time is compared to a threshold time. In various embodiments, the threshold time may be periodically provided and updated by the source system (e.g., headend system 18 of source system 12) or may be manually configurable at the receiver. If the wait time is below the threshold the receiver waits for the requested module to arrive at operation 360. If the wait time exceeds the threshold value the receiver at operation 362 generates a request to be communicated back to the source system. The request requests the module(s) be communicated to the receiver via an alternative source and/or network other than the carousel. In various embodiments, the alternate source may be a backend server system (e.g., backend servers 24) in communication with an application server system (e.g., application server 22) and the network may be a dedicated back channel (e.g., network 28—Internet, etc.) or the broadcast channel network (e.g., broadcast channel 14—satellite, cable, etc.).

At operation 364, the receiver may store metrics including which modules are requested and corresponding wait times. In one embodiment, the receiver periodically, or upon request from the source system, communicates the metrics to the source system to be evaluated along with metrics, if any, received from other receivers to evaluate system performance. Based on this evaluation adjustments may be made to improve performance of the overall system (e.g., interactive television environment 10). For example, it may be determined that specific modules are requested more often and the carousel may be modified to repeat these modules within the cycle or that the overall system may benefit by increasing the carousel frequency (e.g., allocate more bandwidth to the application source 34).

Returning to the method 350, at operation 366 the receiver system receives and processes the requested module to provide the requested data requested in operation 354.

Figure 4:
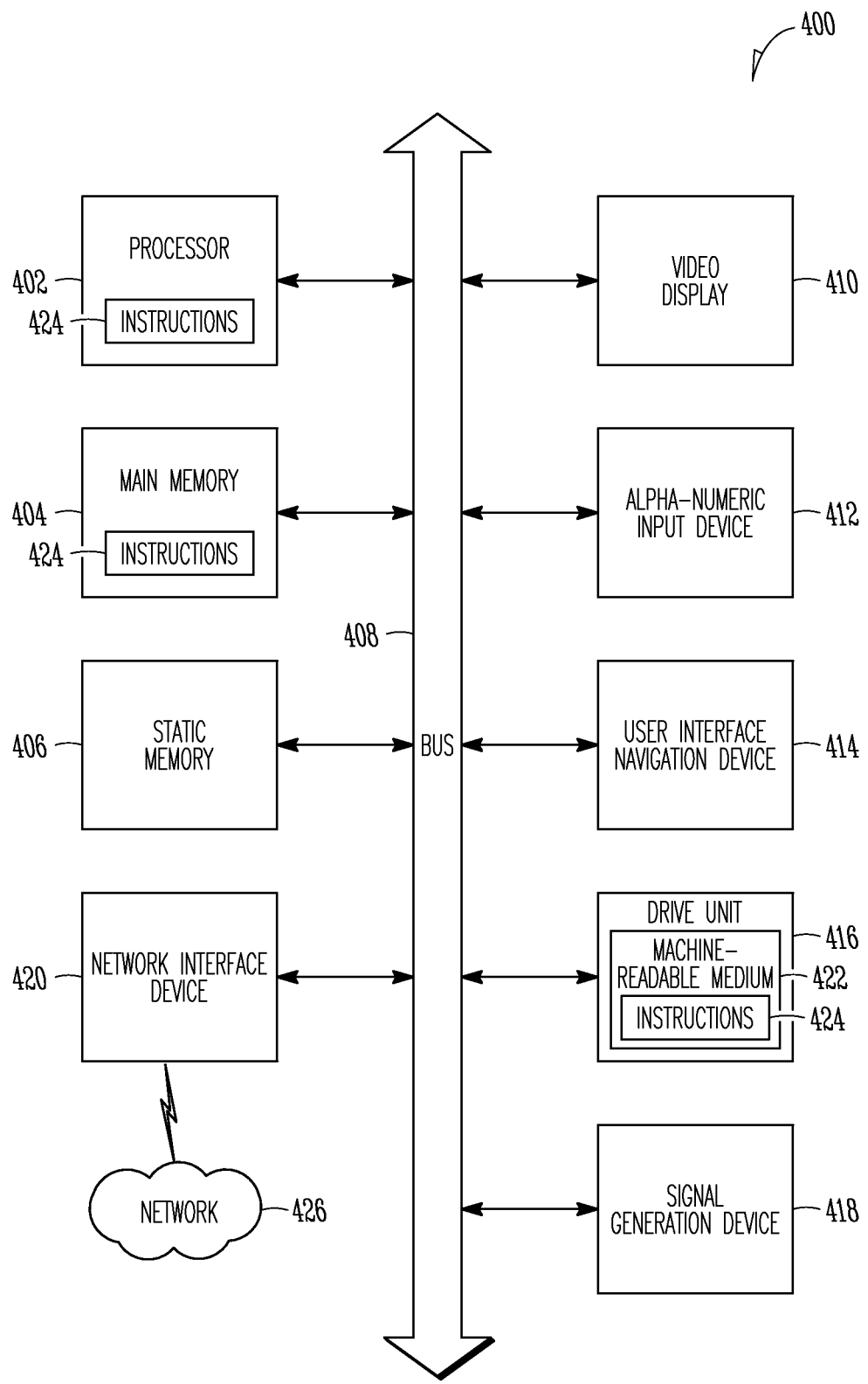
FIG. 4 is a block diagram illustrating a machine, in the exemplary form of a computer system, which may store and execute a set of instructions that cause the machine to perform any of the methods described herein.

FIG. 4 is a block diagram illustrating a machine, in the exemplary form of a computer system 400 within which a set of instructions for causing the machine to perform any one or more of the methodologies and operations discussed herein, may be executed.

The machine may operate as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server, personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processor 402 (e.g., a central processing unit (CPU), a graphics processing unit (GPU), or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions (e.g., software 424) embodying any one or more of the methodologies or functions described herein. In certain embodiments, code necessary to perform various functions may be embedded software stored in Flash, while application code and data may be loaded from the network into RAM. The software 424 may also reside, completely or at least partially, within the main memory 404 and/or within the processor 402 during execution thereof by the computer system 400, the main memory 404 and the processor 402 also constituting machine-readable media (executed directly or indirectly by the machine).

The software 424 may further be transmitted or received over a network 426 via the network interface device 420.

While the machine-readable medium 422 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention.

Thus, a method and system for pushing content in a two-way interactive television environment have been described. Although the present invention has been described with reference to specific exemplary embodiments, it will be evident that various modifications and changes may be made to these embodiments without departing from the broader scope of the invention. Accordingly, the specification and drawings are to be regarded in an illustrative rather than a restrictive sense.

What is claimed is:

1. A method comprising:
receiving a first request for data periodically contained in a data stream being received as a repeating set of modules by a device over a first network from a remote source, the requested data including one or more of the repeating set of modules and appearing with a carousel frequency within the data stream;
determining a number of modules in the repeating set of modules that are between a last module received and the one or more modules included in the requested data;
calculating a wait time until the requested data will next be periodically contained in the data stream being received over the first network from the remote source, the wait time being calculated based on the carousel frequency and the number of modules that are between the last module received and the one or more modules included in the requested data; and
based on a determination that the wait time exceeds a threshold value, communicating a second request for the data to the remote source and receiving the requested data from the remote source via a second network.

2. The method of claim 1, wherein the repeating set of modules is being periodically output from a carousel.

3. The method of claim 1, further comprising:
determining a carousel length by counting a total number of modules in the repeating set of modules through one carousel cycle; and
determining the carousel frequency based on a number of modules being received over a period of time.

4. The method of claim 3, further comprising:
determining the one or more modules included in the requested data based on analyzing at least one item from a list of items including an order of data, a hierarchy of data, and a sequence of data.

5. The method of claim 1, wherein prior to the receiving of the data via the second network, the method further comprises receiving the requested data from the remote source over at least one network from a list of networks including the first network and the second network.

6. The method of claim 1, further comprising:
collecting metric data by determining how many times a request for data is satisfied from the first network and determining how many times a request for data is satisfied from the second network; and
communicating the metric data to the remote source.

7. The method of claim 1, further comprising checking a hierarchy of data availability of the requested data in a previously received multicast over the second network and retrieving the requested data if available.

8. The method of claim 1, further comprising receiving an index module including carousel data, the carousel data including at least one item from a list of items including a carousel length, the carousel frequency, module identifiers, module data types, and module order.

9. The method of claim 8, further comprising receiving the index module as packet data received over the second network.

10. A system, comprising:
a receiver configured to receive a first request for data periodically contained in a data stream being received as a repeating set of modules by a device over a first network from a remote source, the requested data including one or more of the repeating set of modules and appearing with a carousel frequency within the data stream;
one or more hardware processors configured to:
determine a number of modules in the repeating set of modules that are between a last module received and the one or more modules included in the requested data; and
calculate a wait time until the requested data will next be periodically contained in the data stream being received via the first network, the wait time being calculated based on the carousel frequency and the number of modules that are between the last module received and the one or more modules included in the requested data; and
based on a determination that the wait time exceeds a threshold time value, the receiver further configured to communicate a second request for the data to the remote source and to receive the requested data via a second network from the remote source.

11. The system of claim 10, wherein the repeating set of modules is being periodically output from a carousel.

12. The system of claim 10, wherein the one or more hardware processors are further configured to:
determine the one or more modules included in the requested data based on analyzing at least one item from a list of items including an order of data, a hierarchy of data, and a sequence of data.

13. The system of claim 10, further comprising:
an input/output device configured to communicate the second request for the data pertaining to the first request, the second request being made over the second network to the remote source when the wait time exceeds the threshold time value; and
the receiver being further configured to receive the requested data from the remote source over the first network.

14. The system of claim 10, where the one or more hardware processors are further configured to create metric data based on how many times a request for data is satisfied from the data stream and how many times a request for data is satisfied from the second network.

15. The system of claim 14, further comprising an input/output device configured to communicate the metric data to the remote source.

16. The system of claim 10, wherein:
the one or more hardware processors are further configured to check a hierarchy of data availability of the requested data in a previously received multicast over the second network; and the system further comprises
an input/output device configured to retrieve the requested data if available.

17. The system of claim 10, wherein the one or more hardware processors are further configured to process an index module comprising carousel data including at least one of the following items from a list of items including a carousel length, the carousel frequency, module identifiers, module data types, and module order.

18. A machine-readable storage device embodying instructions which, when executed by one or more machines, cause the machines to perform operations comprising:
- receiving a first request for data periodically contained in a data stream being received as a repeating set of modules by a device over a first network from a remote source, the requested data including one or more of the repeating set of modules and appearing with a carousel frequency within the data stream;
- determining a number of modules in the repeating set of modules that are between a last module received and the one or more modules included in the requested data;
- calculating a wait time until the requested data will next be periodically contained in the data stream being received over the first network from the remote source, the wait time being calculated based on the carousel frequency and the number of modules that are between the last module received and the one or more modules included in the requested data; and
- based on a determination that the wait time exceeds a threshold value, communicating a second request for the data to the remote source and receiving the requested data from the remote source via a second network.

19. A method, comprising:
- receiving a first request for data periodically contained in a data stream being received as a repeating set of modules by a device over a first network from a remote source, the requested data including one or more of the repeating set of modules and appearing with a carousel frequency within the data stream; and
- based on a determination that a wait time until the requested data will next be periodically contained in the data stream exceeds a threshold value, communicating a second request for the data to the remote source and receiving the requested data from the remote source via a second network, the wait time being calculated based on the carousel frequency and a number of modules in the repeating set of modules that are between a last module received and the one or more modules included in the requested data.

20. The method of claim 19, further comprising determining the wait time based on analyzing the data stream, the analyzing comprising
- determining the number of modules in the repeating set of modules in the data stream that are between the last module received and a requested module associated with the requested data, and
- calculating the wait time based on the carousel frequency and the number of modules that are between the last module received and the requested module associated with the requested data.

* * * * *

UNITED STATES PATENT AND TRADEMARK OFFICE
CERTIFICATE OF CORRECTION

| | | |
|---|---|---|
| PATENT NO. | : 8,938,546 B2 | Page 1 of 1 |
| APPLICATION NO. | : 13/671336 | |
| DATED | : January 20, 2015 | |
| INVENTOR(S) | : Matthew Orzen | |

It is certified that error appears in the above-identified patent and that said Letters Patent is hereby corrected as shown below:

On Title page 2, in column 2, under "Other Publications", line 32, delete "Mar. 3, 2010"," and insert --Feb. 3, 2010",--, therefor In the Claims, In column 16, line 17, in Claim 20, after "comprising", insert --:--, therefor Signed and Sealed this
Sixteenth Day of June, 2015

Michelle K. Lee
*Director of the United States Patent and Trademark Office*